US008462105B2

(12) United States Patent
Kobayashi et al.

(10) Patent No.: US 8,462,105 B2

(45) Date of Patent: Jun. 11, 2013

(54) THREE-DIMENSIONAL OBJECT DISPLAY CONTROL SYSTEM AND METHOD THEREOF

(75) Inventors: Ryo Kobayashi, Hiroshima (JP); Mitsunobu Furuta, Hiroshima (JP); Masakazu Akiyama, Hiroshima (JP)

(73) Assignee: Hiroshima University, Hiroshima (JP)

( * ) Notice: Subject to any disclaimer, the term of this patent is extended or adjusted under 35 U.S.C. 154(b) by 717 days.

(21) Appl. No.: 12/665,591

(22) PCT Filed: Jul. 31, 2008

(86) PCT No.: PCT/JP2008/063747

§ 371 (c)(1),
(2), (4) Date: Dec. 18, 2009

(87) PCT Pub. No.: WO2010/013336

PCT Pub. Date: Feb. 4, 2010

(65) Prior Publication Data

US 2011/0037691 A1 Feb. 17, 2011

(51) Int. Cl.
*G09G 5/00* (2006.01)

(52) U.S. Cl.
USPC .......... 345/156

(58) Field of Classification Search
USPC ...... 345/156, 418, 427, 474; 382/107; 348/42
See application file for complete search history.

(56) References Cited

U.S. PATENT DOCUMENTS 6,072,504 A * 6/2000 Segen .......... 345/474
6,301,372 B1 * 10/2001 Tanaka .......... 382/106
6,463,116 B1 * 10/2002 Oikawa .......... 378/4
7,062,082 B2 * 6/2006 Miki et al. .......... 382/154
7,346,194 B2 * 3/2008 Miki et al. .......... 382/107

(Continued)

FOREIGN PATENT DOCUMENTS

JP 05-040569 2/1993
JP 06-195168 7/1994

(Continued)

OTHER PUBLICATIONS

"Sandio 3D Game O2," accessed at http://web.archive.org/web/20090503044411/http://www.sandiotech.com/sandio_product.php, accessed on May 24, 2012, pp. 3.

(Continued)

*Primary Examiner* — Fred Tzeng
(74) *Attorney, Agent, or Firm* — Foley & Lardner LLP

(57) ABSTRACT

Provided is a three-dimensional object display control system that enables a three-dimensional object displayed on a screen to be freely rotated by means of instinctive operation. A computer system (10) includes, e.g., a computer (12), a display (14), and a rotation information input device (20). The rotation information input device (20) includes a sphere (22), a tripod (24) that rotatably supports the sphere (22), and a camera (26) that takes an image of the sphere (22). The computer (12) selects two feature points from the image of the sphere (22) taken by the camera (26), and sets two-dimensional coordinates in the image of the feature points. While tracking the feature points, the computer (12) samples the two-dimensional coordinates and transforms them into three-dimensional coordinates on a surface of the sphere (22). Then, the computer (12) calculates a rotation matrix representing a rotation of the sphere (22), based on the three-dimensional coordinates, and multiplies the respective vertex coordinates of the three-dimensional object displayed on the display (14) by the rotation matrix, thereby calculating the respective vertex coordinates of the three-dimensional object after rotated.

20 Claims, 8 Drawing Sheets

FEATURE POINT RESETTING
S101 DIS = DISTANCE IN IMAGE BETWEEN FEATURE POINT r1 AND CENTER OF SPHERE
S102 DIS > PREDETERMINED DISTANCE Ri (NO / YES)
S103 FEATURE POINT r1 RESETTING
S104 DIS0 = DISTANCE BETWEEN FEATURE POINT r1 AND CENTER OF SPHERE
S105 DIS1 = DISTANCE BETWEEN FEATURE POINTS r1 AND r2
S106 DIS0 < PREDETERMINED DISTANCE Ri AND DIS1 > PREDETERMINED DISTANCE RP (NO / YES)
S107 SAME PROCESSING AS ABOVE PERFORMED FOR FEATURE POINT r2
RETURN

U.S. PATENT DOCUMENTS

| | | | | |
|---|---|---|---|---|
| 7,388,969 | B2 * | 6/2008 | Miki et al. | 382/107 |
| 2001/0009414 | A1 | 7/2001 | Badyal et al. | |
| 2005/0009605 | A1 | 1/2005 | Rosenberg et al. | |
| 2006/0250398 | A1 * | 11/2006 | Akada et al. | 345/427 |
| 2009/0100379 | A1 * | 4/2009 | Borchers et al. | 715/851 |
| 2009/0170642 | A1 * | 7/2009 | Ono | 473/455 |
| 2009/0280916 | A1 * | 11/2009 | Zambelli | 473/74 |
| 2010/0030515 | A1 * | 2/2010 | Kludas et al. | 702/159 |
| 2010/0182400 | A1 * | 7/2010 | Nelson et al. | 348/42 |

FOREIGN PATENT DOCUMENTS

| | | |
|---|---|---|
| JP | 09-218744 | 8/1997 |
| JP | 11-203038 | 7/1999 |
| JP | 11-259231 | 9/1999 |
| JP | 2000-081949 | 3/2000 |
| JP | 2000-148391 | 5/2000 |
| JP | 2000-207093 | 7/2000 |
| JP | 2000-330722 | 11/2000 |
| JP | 2001-291119 | 10/2001 |
| JP | 2004-015965 | 1/2004 |
| JP | 2005-032245 | 2/2005 |
| JP | 2005-332061 | 12/2005 |

OTHER PUBLICATIONS

Logitech Trackballs, http://www.logitech.com/en-us/mice-pointers/trackballs, downloaded on Jun. 18, 2012.

Wikipedia., "Trackball," accessed at http://web.archive.org/web/20091201181540/http://en.wikipedia.org/wiki/Trackball, May 4, 2012, 3 pages.

Magill, L., "Touch Technologies Releases OptiBurst 2.0,"accessed at http://web.archive.org/web/20081204053342/http://www.24-7pressrelease.com/press-release/touch-technologies-releases-optiburst-20-77424.php, Dec. 3, 2008.

Translation of Reasons for Refusal issued in the corresponding Japanese Patent Application No. 2009-525835 [for concise explanation]; filed Nov. 17, 2009.

International Search Report issued for PCT/JP2008/063747.

* cited by examiner

THREE-DIMENSIONAL OBJECT DISPLAY CONTROL SYSTEM AND METHOD THEREOF

TECHNICAL FIELD

A three-dimensional object display control system according to the present invention is a three-dimensional object display control system for rotating a three-dimensional object displayed on a screen, the system including a sphere, a camera, a rotation determiner and an object rotater. The sphere is rotatable, and is preferably supported by three bearings, but it may have nothing to support it. The camera takes an image of the sphere. The rotation determiner is arranged to determines a rotation of the sphere based on the image of the sphere taken by the camera. The object rotator arranged to rotates the three-dimensional object in conjunction with the rotation determined by the rotation determiner.

BACKGROUND ART

In recent years, three-dimensional graphics have been used in various fields. For example, in the scientific field, it is used, e.g., when displaying the results of numerical calculation or when viewing the structure of a protein. In the industrial field, it is used for, e.g., automobile designing, architectural designing, or CAD (Computer Aided Design). Also, for familiar examples, it can be seen in TVs, PCs, video games, etc.

Many systems employ a mouse as an input device for rotating a three-dimensional object displayed on a screen. In most applications, an operation to rotate a three-dimensional object with a mouse enables rotation of the object around the vertical axis on the screen when moving the mouse rightward or leftward and rotation of the object around the horizontal axis when moving the mouse forward or backward.

However, it is impossible to freely rotate the three-dimensional object by means of instinctive mouse operation. In other words, it is not easy to rotate the object around an axis perpendicular to the screen by means of operating the mouse to move back and forth and around. For example, in order to rotate the object around an axis perpendicular to the screen by 180 degrees, it is necessary to, first, move the mouse to the right or left to rotate it around the vertical axis by 180 degrees, and then, to move the mouse forward or backward to rotate it around the horizontal axis by 180 degrees. An operation to perform rotation around an axis perpendicular to the screen may be possible, but when it comes to rotation around an axis slightly diagonally intersecting with the screen, an operation to perform such rotation is extremely difficult.

Japanese Patent Laid-Open No. 2005-32245 describes a controller for a video game. This controller includes a joystick shaft, a spherical element mounted below the joystick shaft, an imager that sequentially inputs images of the surface of the spherical element, and a movement detector that detects movement of the element based on the results of comparison between the plural input images. This controller is basically used as an input device for two-dimensional or three-dimensional coordinates, and is not intended for rotation of a three-dimensional object displayed on a screen.

Japanese Patent Laid-Open No. 2000-330722 describes a position information input device for three-dimensionally moving a displayed image. This input device includes a rotation detecting mechanism for rotating a displayed image around an X-axis, a Y-axis and a Z-axis. The rotation detecting mechanism is configured to, upon a sphere being rolled with the tip of a finger, output the direction and amount of the rotation; however, the detection of the rotation is performed mechanically.

Japanese Patent Laid-Open No. 2000-207093 describes a rotation display device for a three-dimensional figure. This rotation display device, upon a ball body being rotated with a hand, detects such rotation to rotate a displayed image concurrently; however, the detection of the rotation is also performed mechanically.

Japanese Patent Laid-Open No. 9-218744 describes a mouse for rotating a displayed three-dimensional graphic image; however, the structure thereof is completely different from the present invention, which will be described later.

SUMMARY

An object of the present invention is to provide a three-dimensional object display control system and method, which enable a three-dimensional object displayed on a screen to be freely rotated by means of instinctive operation, and a three-dimensional object display control program used for the same.

A three-dimensional object display control system according to the present invention is a three-dimensional object display control system for rotating a three-dimensional object displayed on a screen, the system including a sphere, a camera, rotation determining means and object rotating means. The sphere is rotatable, and is preferably supported by three bearings, but it may have nothing to support it. The camera takes an image of the sphere. The rotation determining means determines a rotation of the sphere based on the image of the sphere taken by the camera. The object rotating means rotates the three-dimensional object in conjunction with the rotation determined by the rotation determining means.

According to the present invention, where the sphere is rotated by means of a user's operation, the rotation of the sphere is determined based on the image of the sphere taken by the camera, and the three-dimensional object is rotated in conjunction with the determined rotation. Accordingly, the three-dimensional object displayed on the screen can freely be rotated by means of instinctive operation.

The rotation determiner may include: a feature point setter arranged to set at least two feature points in the image of the sphere taken by the camera; feature point tracker arranged to track the feature points set by the feature point setter; and a determiner arranged to determine a rotation of the sphere based on the feature points that are being tracked by the feature point tracker.

The rotation determiner may include: a feature point setter arranged to select at least two feature points from the image of the sphere taken by the camera, and set two-dimensional coordinates in the image of the feature points; a feature point tracker arranged to track the two-dimensional coordinates of the feature points set by the feature point setter; a sampler arranged to obtain the two-dimensional coordinates of the feature points updated by the feature point tracker at predetermined time intervals; a coordinate transformer arranged to transform the two-dimensional coordinates of the feature points obtained by the sampler into three-dimensional coordinates on a surface of the sphere; and rotation matrix calculator arranged to calculate a rotation matrix representing the rotation of the sphere, based on the three-dimensional coordinates obtained as a result of the transformation by the coordinate transformer.

The three-dimensional object display control system may further comprise: a feature point resetter arranged to, where a distance in the image from any one of the feature points that are being tracked by the feature point tracker to a center of the sphere is longer than a first predetermined distance, set one new feature point instead of the one feature point. A distance in the image from the one new feature point to the center of the sphere may be shorter than the first predetermined distance.

In this case, only feature points with a large amount of displacement per unit time are used, and thus, the rotation of the sphere can be determined with high accuracy.

A distance in the image from the one new feature point to the other feature point may be longer than a second predetermined distance.

In this case, the distance between the feature points is long, and thus, the rotation of the sphere can be determined with high accuracy.

A three-dimensional object display control method according to the present invention is a three-dimensional object display control method for rotating a three-dimensional object displayed on a screen, the method comprising the steps of: rotating a sphere; taking an image of the sphere by a camera; determining a rotation of the sphere based on the image of the sphere taken by the camera; and rotating the three-dimensional object in conjunction with the determined rotation of the sphere.

According to the present invention, where the sphere is rotated by means of a user's operation, the rotation of the sphere is determined based on the image of the sphere taken by the camera, and the three-dimensional object is rotated in conjunction with the determined rotation. Accordingly, the three-dimensional object displayed on the screen can freely be rotated by means of instinctive operation.

A three-dimensional object display control program according to the present invention is a three-dimensional object display control program for rotating a three-dimensional object displayed on a screen, the program making a computer execute the steps of: obtaining an image of a sphere taken by a camera; determining a rotation of the sphere based on the image of the sphere taken by the camera; and rotating the three-dimensional object in conjunction with the determined rotation of the sphere.

According to the present invention, where the sphere is rotated by means of a user's operation, the rotation of the sphere is determined based on the image of the sphere taken by the camera, and the three-dimensional object is rotated in conjunction with the determined rotation. Accordingly, the three-dimensional object displayed on the screen can freely be rotated by means of instinctive operation.

DETAILED DESCRIPTION

Figure 1:
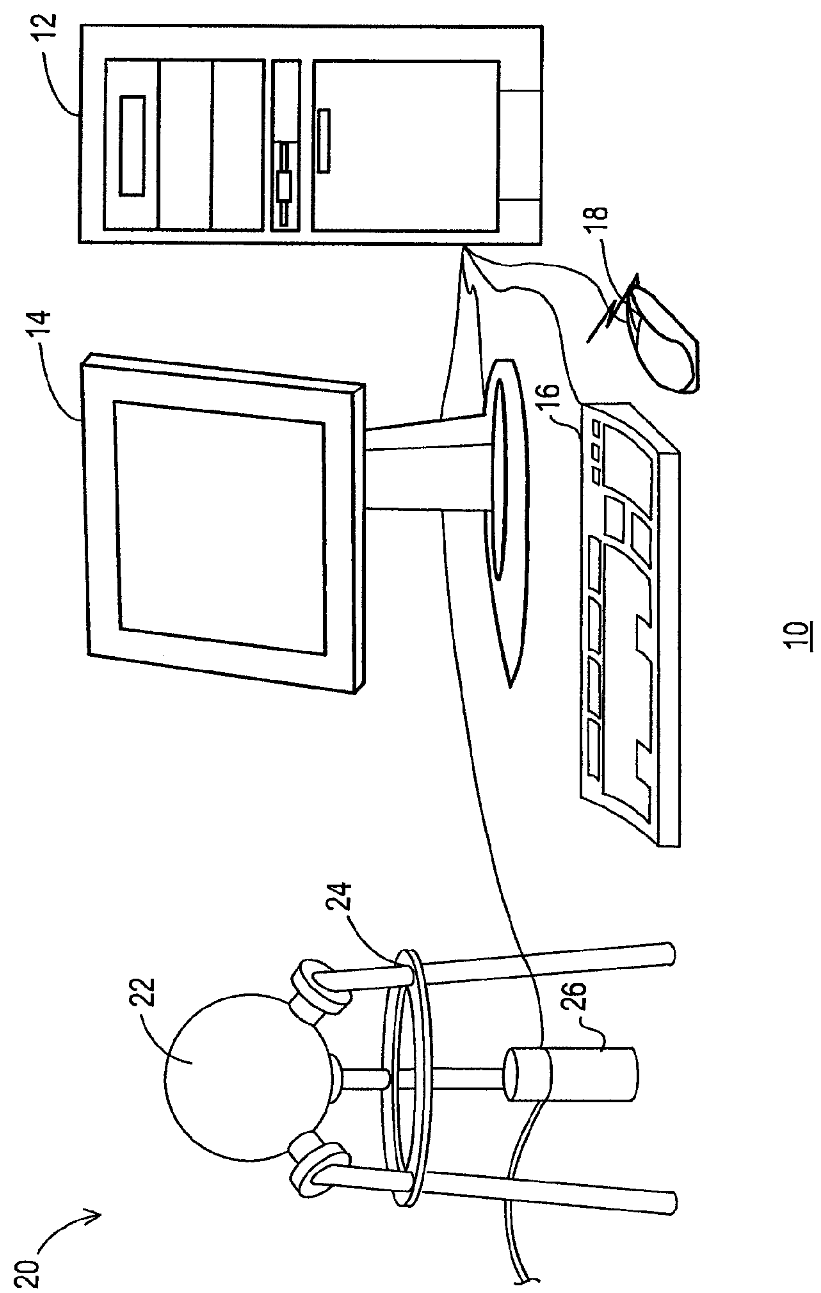
FIG. 1 is a diagram illustrating an overall configuration of a computer system using a three-dimensional object display control system according to an embodiment of the present invention.

Hereinafter, an embodiment of the present invention will be described in details with reference to the drawings. In the drawings, parts that are the same or correspond to each other are provided with the same reference numerals and a description thereof will not be repeated.

With reference to FIG. 1, a computer system 10 using a three-dimensional object display control system according to an embodiment of the present invention includes a computer 12, a display 14, a keyboard 16, a mouse 18 and a rotation information input device 20. The display 14, the keyboard 16, the mouse 18 and the rotation information input device 20 are connected to the computer 12. The computer 12, the display 14, the keyboard 16 and the mouse 18 are general-purpose ones.

The computer 12 includes, e.g., a CPU (Central Processing Unit), a ROM (Read Only Memory), a RAM (Random Access Memory) and a hard disk (though the illustration thereof is omitted). In the computer 12, a three-dimensional object display control program (including, e.g., a driver for the rotation information input device 20 and object tracking software), which will be described later, is installed in addition to an OS (Operating System) and three-dimensional graphics software. For the three-dimensional graphics software, for example, OpenGL (Open Graphics Library) (Intel Open Source Computer Vision Library) (registered trademark; the same applies to the below description) is used. OpenGL is a program interface for creating three-dimensional graphics, which was developed mainly by Silicon Graphics, Inc., U.S. It is characterized in that: high precision three-dimensional graphics can be created at high speed; and it does not depend on the OS. Also, for the object tracking software, for example, OpenCV (trademark; the same applied to the below description) is used. OpenCV is a computer vision library developed and laid open by Intel Corporation, U.S. The RGB values of each pixel can be extracted from data acquired from a camera. Using the acquired data, a certain point in an image can be tracked. Those pieces of software are stored in the hard disk, and executed upon being read by the CPU.

The rotation information input device 20 includes a sphere 22, a tripod 24 that rotatably supports the sphere 22 at three ball bearings, and a camera 26 that takes an image of the sphere 22 from below. In order to facilitate detection of the sphere 22's rotation, multiple relatively-small triangles are drawn on the surface of the sphere 22. Upon a user manually operating the sphere 22, the sphere 22 is rotated in a desired direction by a desired amount with its center fixed. The camera 26 is installed so that its optical axis passes through the center of the sphere 22.

Next, an operation of the above-described computer system 10 will be described.

Figure 2:
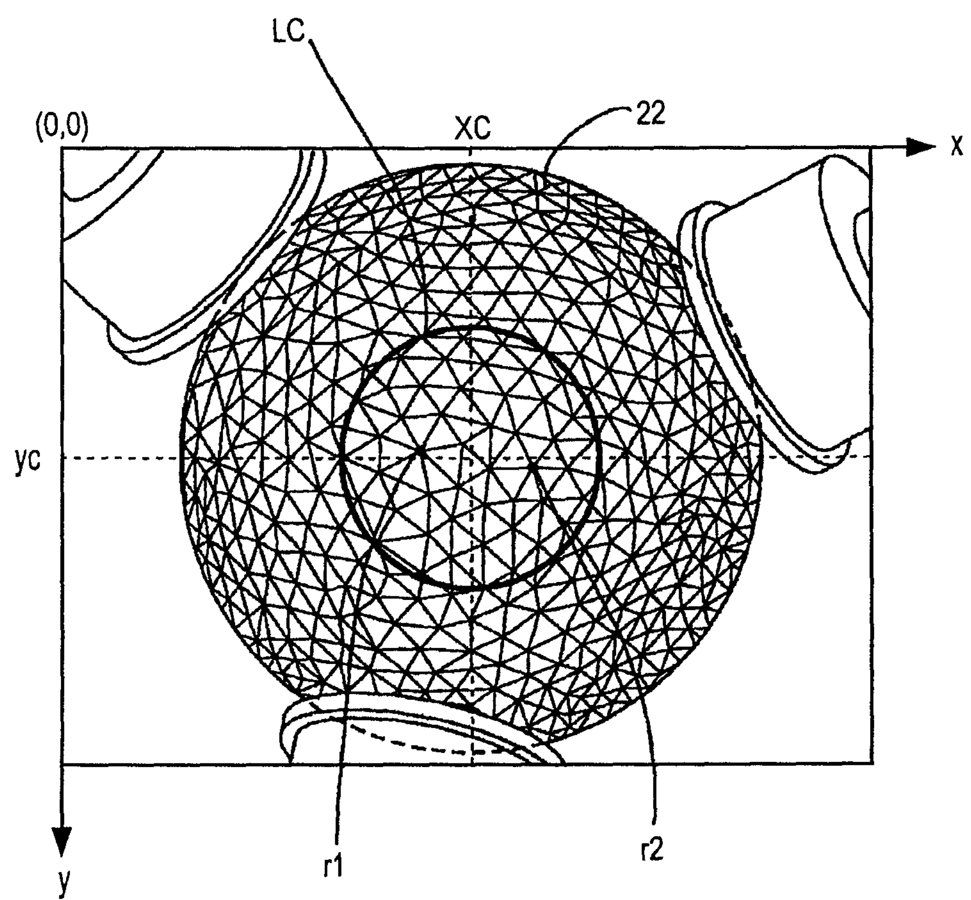
FIG. 2 is a diagram illustrating an image of a sphere taken by the camera in FIG. 1.

Upon an image of the sphere 22 being taken from below by the camera 26, an image such as illustrated in FIG. 2 is obtained. The sphere 22 is shown in its maximum size on the screen, and the tips of the tripod 24 are shown on three sides of the sphere 22. The obtained image is sent to the computer 12.

Figure 3:
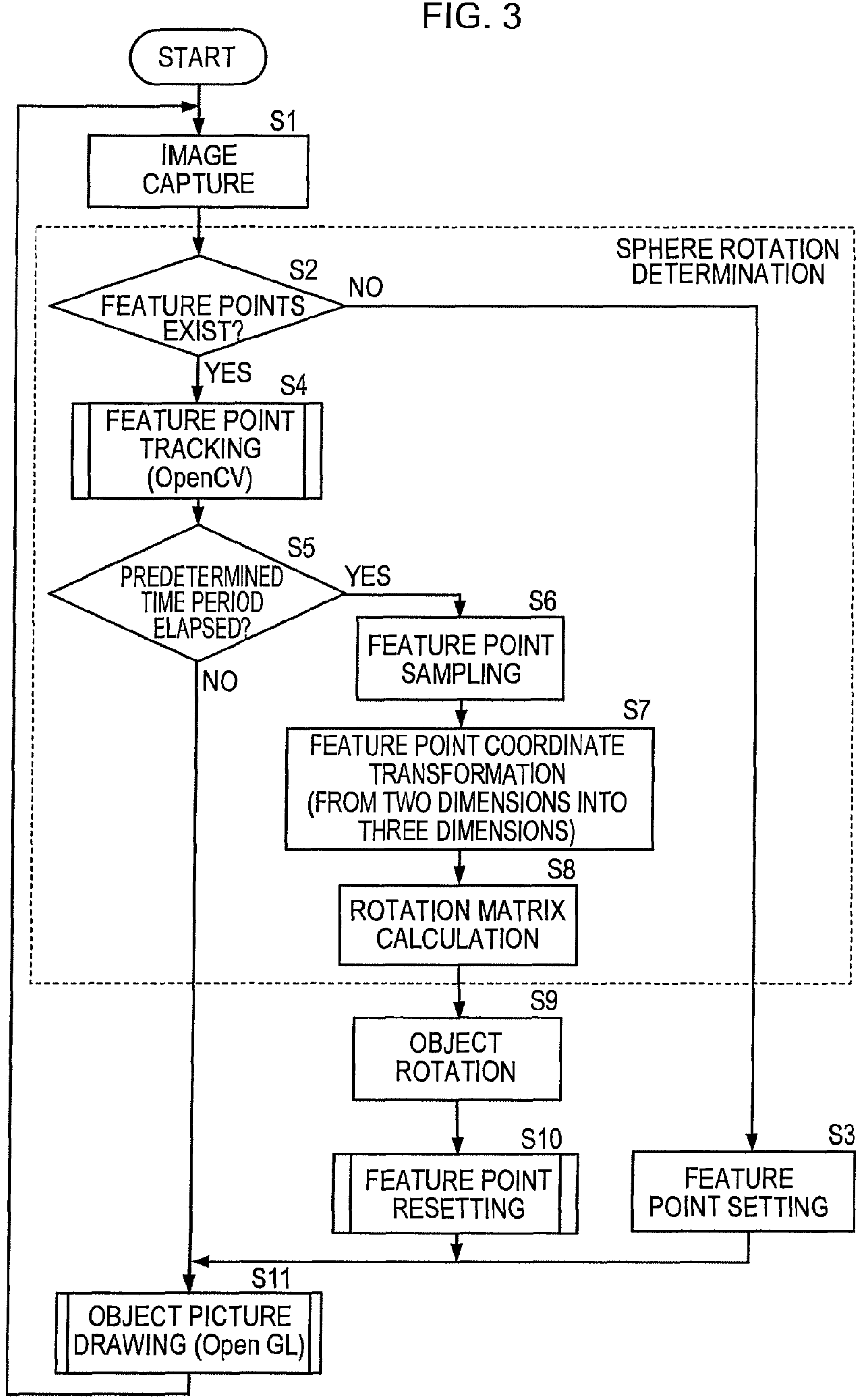
FIG. 3 is a flowchart illustrating an operation of the computer system illustrated in FIG. 1.

FIG. 3 illustrates a flowchart for a three-dimensional object display control program. However, drawing of a picture of a three-dimensional object is performed by three-dimensional graphics software such as OpenGL.

With reference to FIG. 3, the computer 12 captures an incoming image in a predetermined cycle (S1). The computer 12 determines whether or not any feature points exit in the captured image (S2). At first, no feature points exist (NO in S2), and thus, the computer 12, as illustrated in FIG. 2, sets two feature points r1 and r2 in the image of the sphere 22 (S3). More specifically, the computer 12 selects two feature points r1 and r2 on the image of the sphere, and sets two-dimensional coordinates (x, y) in the image of the feature points r1 and r2 (S3). The feature points r1 and r2 are set in positions that can easily be distinguished from the other part (in the present example, vertexes of triangles drawn on the surface of the sphere 22).

The two-dimensional coordinates (x, y) are defined as follows. As illustrated in FIG. 2, an x-y coordinate system is introduced into the image, and the upper left corner of the image is set to the origin (0, 0). The camera 26 is installed so that its optical axis passes through the center of the sphere 22, and thus, the coordinates (xc, yc) of the center C of the sphere 22 correspond to the center of the image.

Meanwhile, where feature points r1 and r2 exist (YES in S2), the computer 12 tracks the feature points r1 and r2 using the function of OpenCV (S4). More specifically, upon the sphere 22 being rotated by means of a user's operation, the feature points r1 and r2 are moved, and thus, the computer 12 updates the two-dimensional coordinates (x, y) of the feature points r1 and r2 (S4).

While tracking the feature points r1 and r2 as described above, the computer 12 samples (acquires) the two-dimensional coordinates (x, y) of the feature points r1 and r2 at predetermined time intervals (S5 and S6).

Next, the computer 12 transforms the two-dimensional coordinates (x, y) of the feature points r1 and r2 into three-dimensional coordinates (X, Y, Z) on the surface of the sphere 22 (S7).

Figure 4:
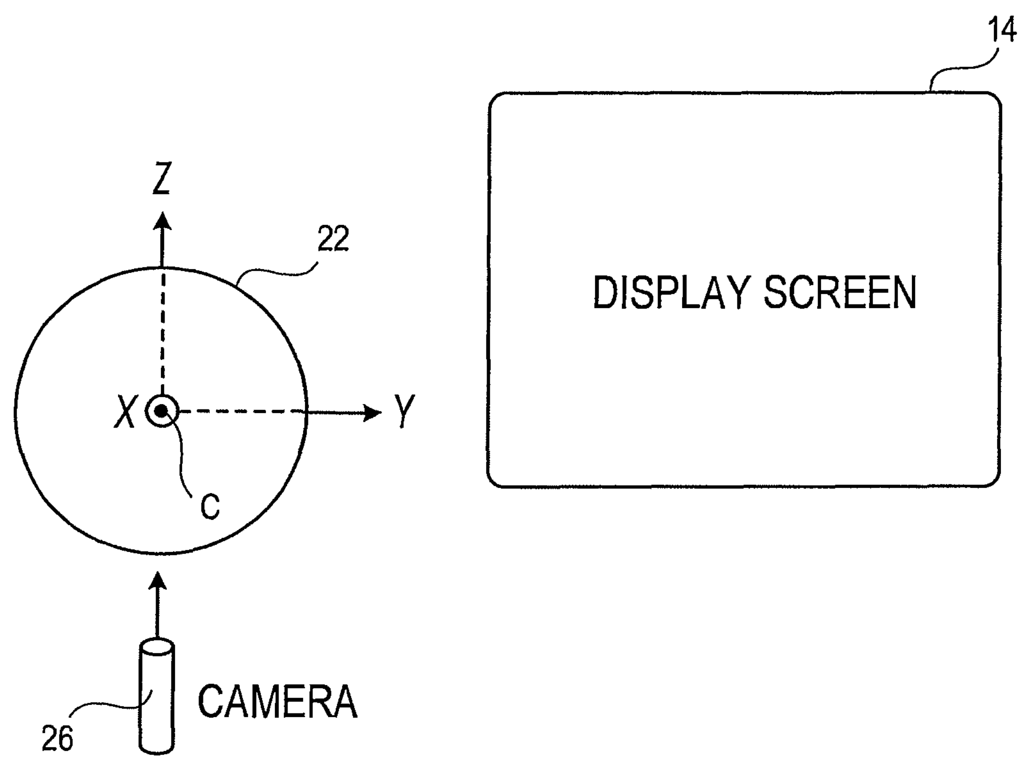
FIG. 4 is a diagram illustrating an X-Y-Z coordinate system introduced into a real space in the computer system illustrated in FIG. 1.

The three-dimensional coordinates (X, Y, Z) are defined as follows. As illustrated in FIG. 4, an X-Y-Z coordinate system is introduced into a real space (three-dimensional space). It is assumed that: the sphere 22 has been installed in front of the left side of the display 14; and the center C of the sphere 22 is set to the origin (0, 0, 0). It is assumed that: the direction perpendicular to the display screen, in which a user is present, is the X-axis; the horizontal rightward direction relative to the display screen is the Y-axis; and the vertical upward direction is the Z-axis.

Figure 5:
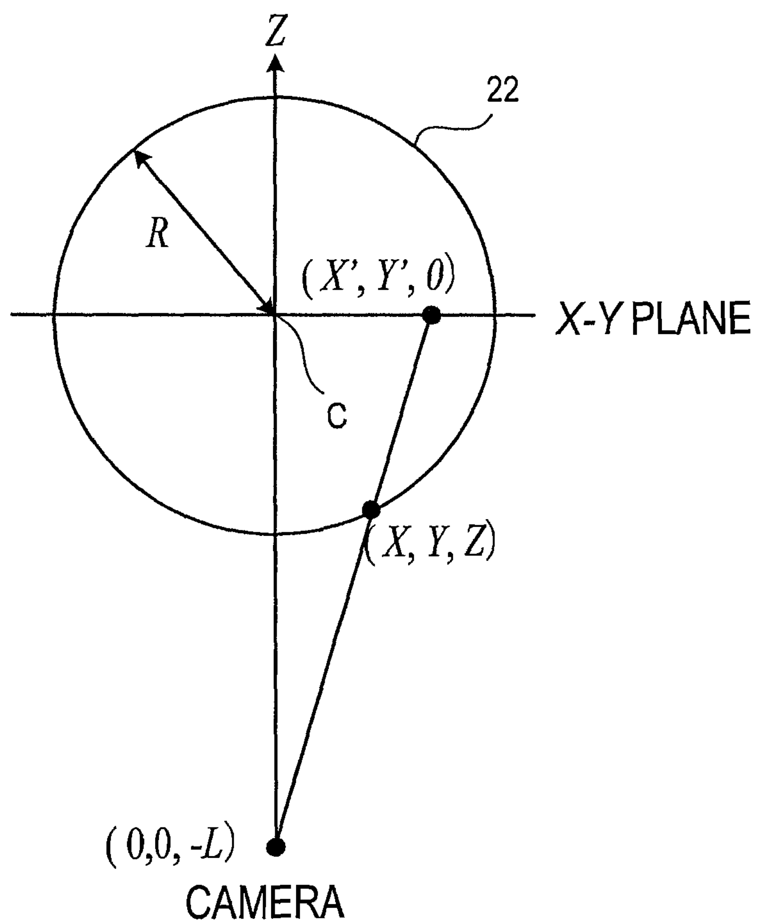
FIG. 5 is a diagram illustrating a state in which points (X, Y, Z) on the surface of the sphere illustrated in FIG. 4 are projected on an X-Y plane.

When the two-dimensional coordinates (x, y) of the feature points r1 and r2 are given, their three-dimensional coordinates (X, Y, Z) are calculated as follows. As illustrated in FIG. 5, the distance between the camera 26 and the center C of the sphere 22 is set to L; and the radius of the sphere 22 is set to R. Where coordinates of a point obtained as a result of projecting a feature point (X, Y, Z) on the surface of the sphere 22 from the camera 26's position (0, 0, −L) onto the X-Y plane are (X', Y', 0), (X, Y, Z) is represented in expression (1) below.

[Expression 1]

$$(X, Y, Z)=(1-t)(0,0,-L)+t(X',Y',0)=(tX', tY',-(1-t)L) \quad (1)$$

Since the feature point (X, Y, Z) is on the surface of the sphere 22 with the radius R, t can be represented by expression (2) below.

[Expression 2]

$$t = \frac{L^2 - \sqrt{R'^2(R^2 - L^2) + L^2R^2}}{R'^2 + L^2} \text{ where } R'^2 = X'^2 + Y'^2 \quad (2)$$

As described above, correspondence from (X', Y') to (X, Y, Z) can be provided by expressions (1) and (2).

Finally, the correspondence between the coordinates (X, Y) on the X-Y plane and the coordinates (x, y) in the image is calculated. The radius Rc of the image of the sphere 22 projected on the X-Y plane can be represented by expression (3) below.

[Expression 3]

$$R_c = \frac{LR}{\sqrt{L^2 - R^2}} \quad (3)$$

Using this radius Rc and the radius rc of the sphere 22 in the image, the coordinates (X', Y') of the feature point on the X-Y plane can be represented by expression (4) below.

[Expression 4]

$$(X', Y') = \frac{R_c}{r_c}(x - x_c, y_c - y) \quad (4)$$

Consequently, the correspondence from (x, y) to (X', Y') has been calculated, and combining it with the above-described correspondence from (X', Y') to (X, Y, Z), the three-dimensional coordinates (X, Y, Z) on the surface of the sphere 22 can be calculated from the two-dimensional coordinates (x, y) of the feature points r1 and r2.

Referring back to FIG. 3, after the above-described coordinate transformation of the feature points (S7), the computer 12 calculates a rotation matrix representing the rotation of the sphere 22, based on the three-dimensional coordinates (X, Y, Z) (S8). The details are provided below.

First, for preparation, where a unit vector l=(lx, ly, lz) is a rotation axis, a matrix R(l, θ)∈SO(3) representing a transformation for rotation around the rotation axis by an angle θ can be represented by expression (5) below. Here, SO3 is a special orthogonal group, and is one having a determinant value of 1 from among three-dimensional real orthogonal matrixes.

[Expression 5]

$$R(l,\theta)=ll^T+\cos\theta(I-ll^T)+S\sin\theta \quad (5)$$

Where, $l^T$ is a transposition of l, and I is an unit matrix, and S is represented by expression (6) below.

[Expression 6]

$$S = \begin{pmatrix} 0 & -l_z & l_y \\ l_z & 0 & -l_x \\ -l_y & l_x & 0 \end{pmatrix} \quad (6)$$

Expression (5) is represented by expression (7) below where it is indicated by elements.

[Expression 7]

$$R(l,\theta)=\begin{pmatrix} l_x^2(1-\cos\theta)+\cos\theta & l_xl_y(1-\cos\theta)-l_z\sin\theta & l_xl_z(1-\cos\theta)+l_y\sin\theta \\ l_xl_y(1-\cos\theta)-l_z\sin\theta & l_y^2(1-\cos\theta)+\cos\theta & l_yl_z(1-\cos\theta)+l_x\sin\theta \\ l_xl_z(1-\cos\theta)+l_y\sin\theta & l_yl_z(1-\cos\theta)+l_x\sin\theta & l_z^2(1-\cos\theta)+\cos\theta \end{pmatrix} \quad (7)$$

In particular, if θ=0 (that is, the rotation angle is zero degrees), R(l, θ)=I regardless of the value of l. Since the center C of the sphere 22 is fixed, hereinafter, it is assumed that the origin of the coordinate system is the center C of the sphere 22.

Figure 6:
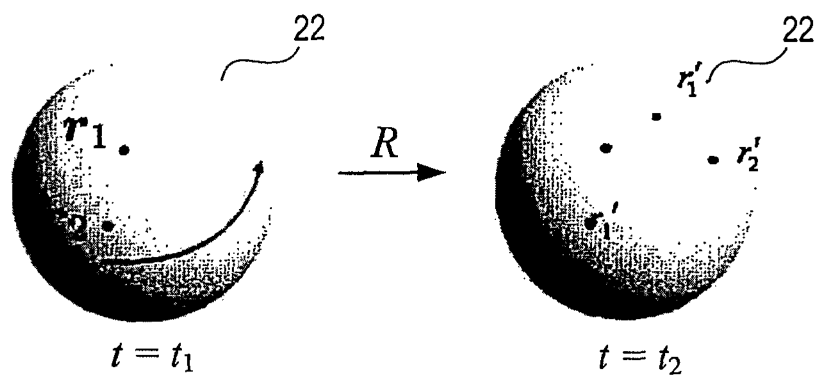
FIG. 6 is a diagram illustrating movement of feature points when the sphere in FIG. 1 is rotated.

FIG. 6 illustrates movement of two points as a result of rotation R of the sphere 22 occurring between a time t1 and a time t2. The movement from r1 to r1' is represented by r1'=Rr1. The movement from r2 to r2' is represented by r2'=Rr2.

In order to obtain a rotation matrix R∈SO(3) representing the rotation of the sphere 22 occurring between the time t1 and the time t2, the movement of the two points on the surface of the sphere 22 is measured. This is because the rotation matrix RESO(3) can uniquely determined if the positional correspondences of the two points between before and after the rotation can be figured out.

Figure 7:
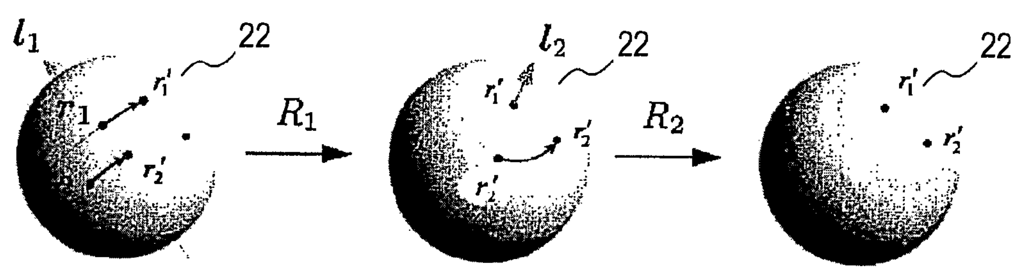
FIG. 7 is a diagram illustrating movement of feature points when the rotation illustrated in FIG. 6 is divided into two rotations.

The outline of obtainment of this rotation matrix R is as follows. With reference to FIG. 7, the sphere 22 is first rotated around an axis 11, and then rotated around an axis 12, allowing r1 to be moved to r1' and r2 to be moved to r2'. Therefore, first, a rotation matrix R1 (for the rotation axis 11) for superposing the point r1 on the point r1' is obtained. Here, the rotation axis 11 is determined so that it is perpendicular to a plane including a great circle passing through the point r1 and the point r1'. As a result of this rotation, r2 is moved to r2'=R1r2. Next, a rotation matrix R2 for rotating the sphere 22 around an axis 12 passing through the center C of the sphere 22 and the point r1' to superpose the point r2' on the point r2' is obtained. Finally, upon combining these two rotation matrixes, a rotation matrix R=R2R1 can be obtained.

Next, a method for specifically calculating the rotation matrix R will be described. The rotation axis (unit vector) of the first rotation R1 can be calculated by expression (8) using an exterior product.

[Expression 8]

$$l_1=\frac{r_1\times r_1'}{|r_1\times r_1'|} \quad (8)$$

Also, the rotation angle ϕ1 around the rotation axis 11 can be calculated by expression (9) below.

[Expression 9]

$$\phi_1=\arcsin\left(\frac{|r_1\times r_1'|}{|r_1||r_1'|}\right) \quad (9)$$

Here, in actual calculation, it is assumed that 0≦ϕ1<π/2 based on the facts that: the interval between the time t1 and the time t2 is small; and a rotation occurring therebetween is also small. Where r1=r1', 11 takes an appropriate unit vector, and it is assumed that ϕ1=0.

Figure 8A:
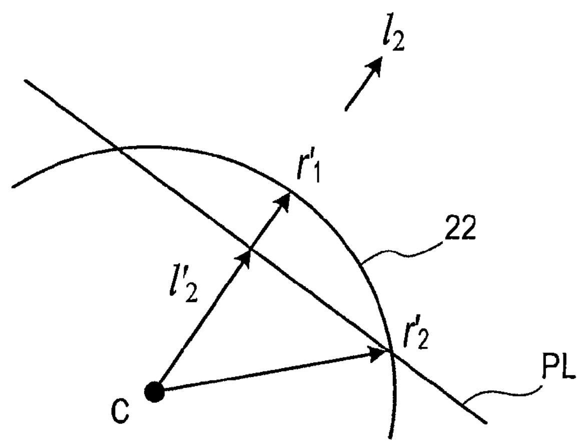
FIG. 8(*a*) is a cross-sectional view taken along a plane passing through a sphere center and points r1' and r2', and FIG. 8(*b*) is a perspective view of FIG. 8(*a*), which illustrates a rotation angle $\phi$2.
Figure 8B:
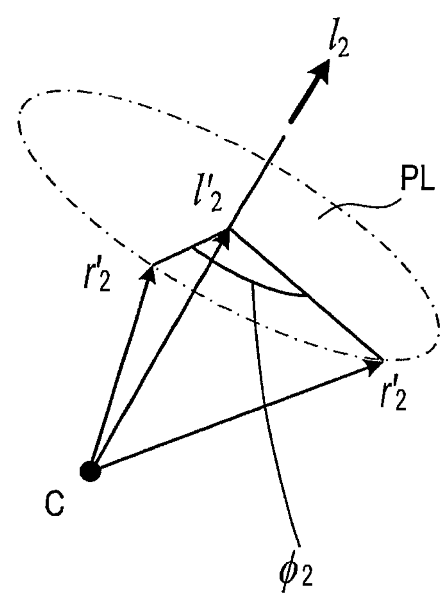

With reference to FIGS. 8(*a*) and 8(*b*), the rotation axis 12 (unit vector) of the second rotation R2 can be provided by expression (10) below.

[Expression 10]

$$l_2=\frac{r_1'}{|r_1'|} \quad (10)$$

The rotation angle ϕ2 will be calculated as follows. The vector 12' of the intersection point of a plane PL passing through the point r2' and the point r2' and perpendicular to the rotation axis 12 and the rotation axis is represented by expression (11) below.

[Expression 11]

$$l'_2=(r'_2\cdot l_2)l_2 \quad (11)$$

The rotation angle ϕ2 around the rotation axis 12 is represented by expression (12) below.

[Expression 12]

$$\varphi_2=\arcsin\left(\frac{|(r_2'-l_2')\times(r_2'-l_2')|}{|r_2'-l_2'||r_2'-l_2'|}\right) \quad (12)$$

Here, also using the fact that the rotation is small, it is assumed that 0≦ϕ2<π/2. Also, where r2'=r2', 12 takes an appropriate unit vector, and it is assumed that ϕ2=0.

As described above, the rotation axis and rotation angle combinations (11, ϕ1) and (12, ϕ2) for the two rotations can be obtained. Where the rotation axes and the rotation angles are figured out, the rotation matrixes R1=R(11, ϕ1) and R2=R(12, ϕ2) for the respective steps can be calculated by expression (5), and the rotation matrix R can be obtained by expression (13) below.

[Expression 13]

$$R=R_2R_1=R(l_2,\phi_2)R(l_1,\phi_1) \quad (13)$$

Referring back to FIG. 3 again, after the aforementioned rotation matrix calculation (S8), the computer 12 rotates the three-dimensional object displayed on the screen of the display 14 in conjunction with the rotation of the sphere 22 determined above (S9). More specifically, the computer 12 multiplies the respective vertex coordinates of the three-dimensional object by the rotation matrix R calculated above. Consequently, the respective vertex coordinates of the three-dimensional object after rotated.

Next, where the distance in the image from one feature point r1 or r2, which is being tracked as described above, to the center of the sphere 22 is longer than a predetermined distance RI, the computer 12 resets a new feature point instead of the feature point r1 or r2 (S10). However, the new feature point is reset so that: the distance in the image from the new feature point to the center of the sphere 22 is shorter than the predetermined distance RI; and the distance in the image from the new feature point to the other feature point r2 or r1 is longer than a predetermined distance RP.

More specifically, with reference to FIG. 2, a limited circle LC is set in the image of the sphere 22. The center of the limited circle LC corresponds to the center C of the sphere 22. The radius RI of the limited circle LC is smaller than the radius R of the sphere 22, and is preferably approximately half the radius R of the sphere 22. When either of the feature points r1 and r2 that are being tracked departs from the limited circle LC, a new feature point is reset in the limited circle LC instead of the feature point. Where the sphere 22 is rotated at a constant speed, in the image, the speed of a feature point is high around the center of the sphere 22, but becomes lower as the feature point comes closer to the outer edge of the sphere 22. Accordingly, where the feature point is continuously tracked until it comes around the outer edge of the sphere 22, the accuracy of detecting the rotation of the sphere 22 is lowered. Therefore, in the present embodiment, the rotation of the sphere 22 is determined from feature points within the limited circle LC.

Furthermore, when resetting the new feature point, it is preferable to reset it as far as possible from the other feature point. This is because an excessive short distance between the feature points results in lowering the accuracy of detecting the rotation of the sphere 22. In the present embodiment, the feature point is reset in a position that is at least the predetermined distance RP away from the other feature point.

Figure 9:
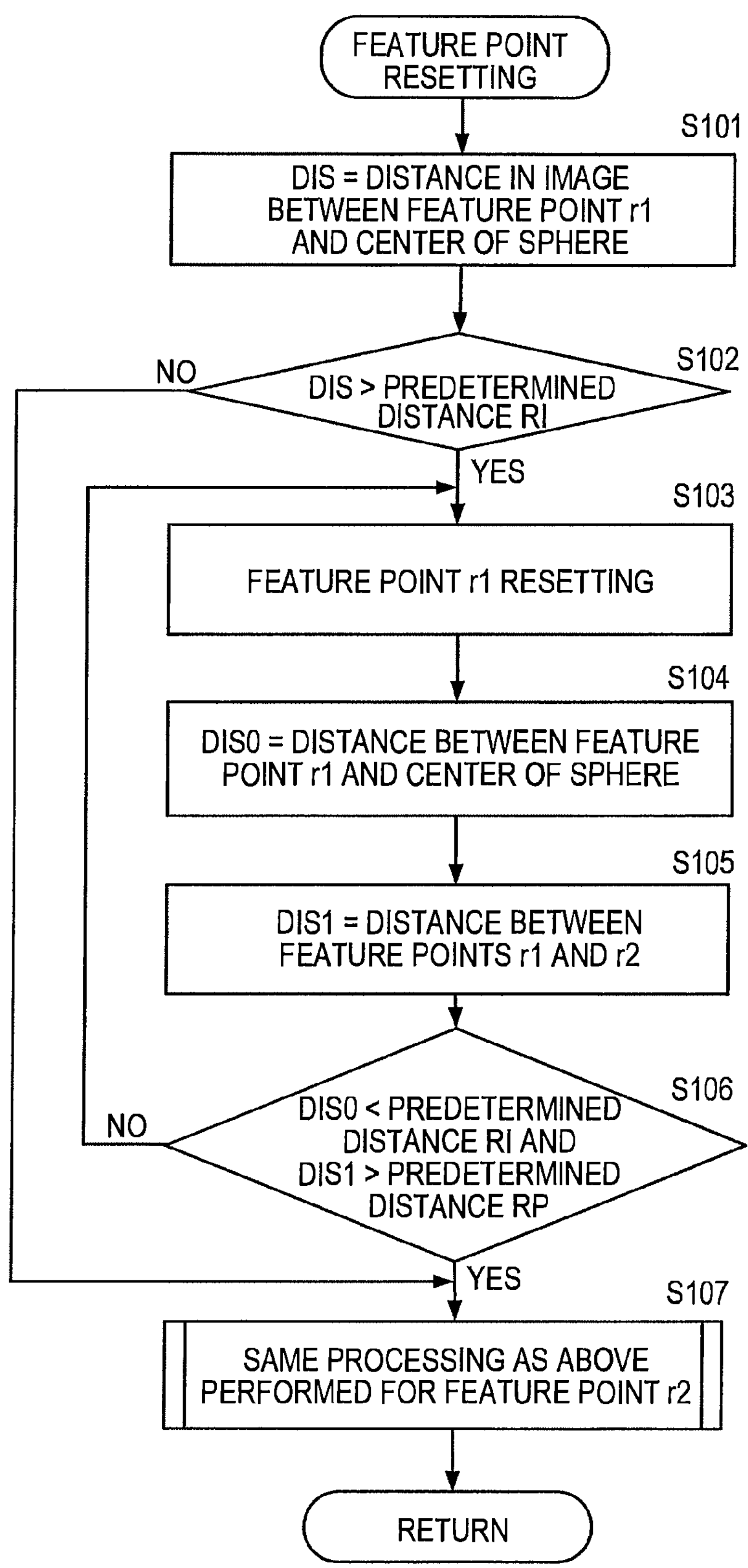
FIG. 9 is a flowchart illustrating the details of feature point resetting in FIG. 3.
Figure 2:
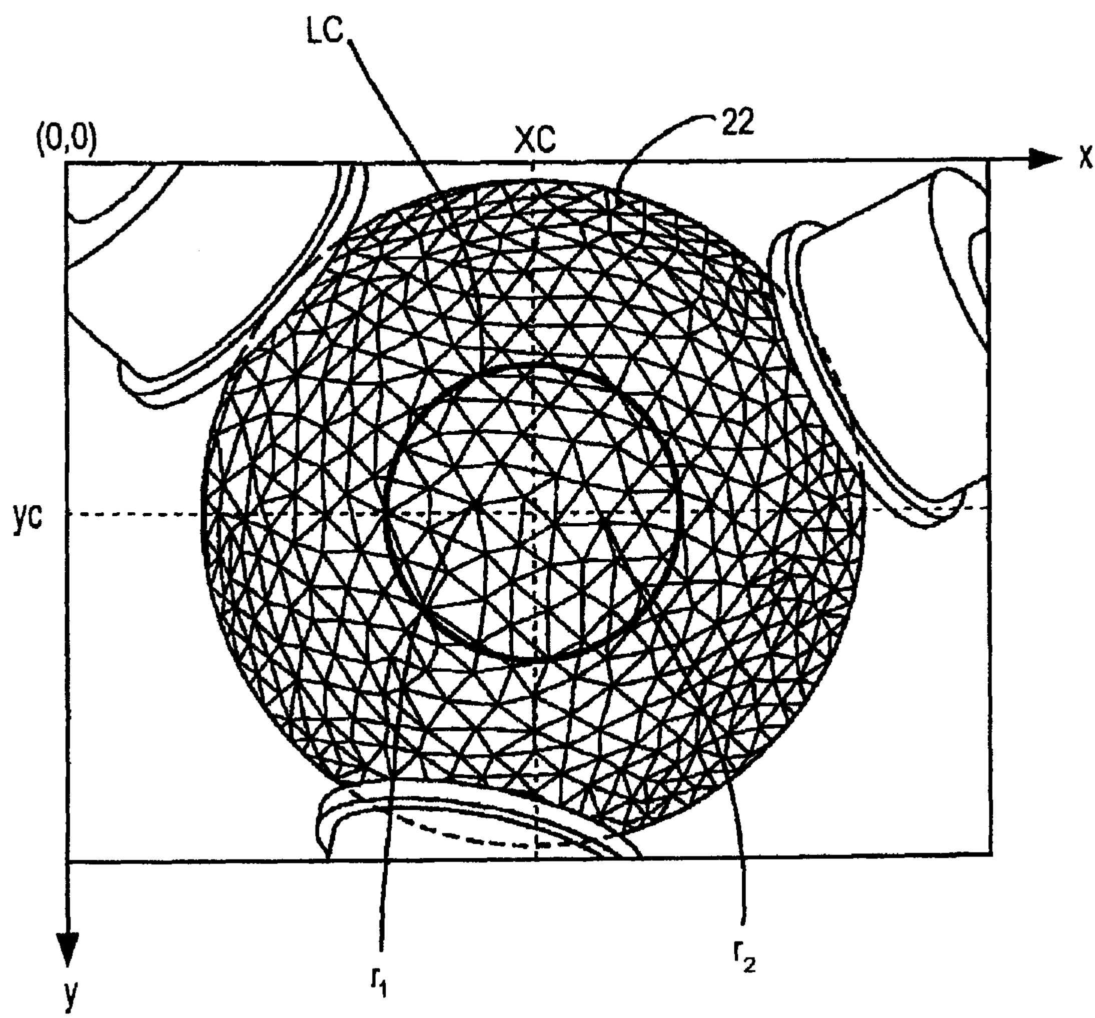
Figure 9:
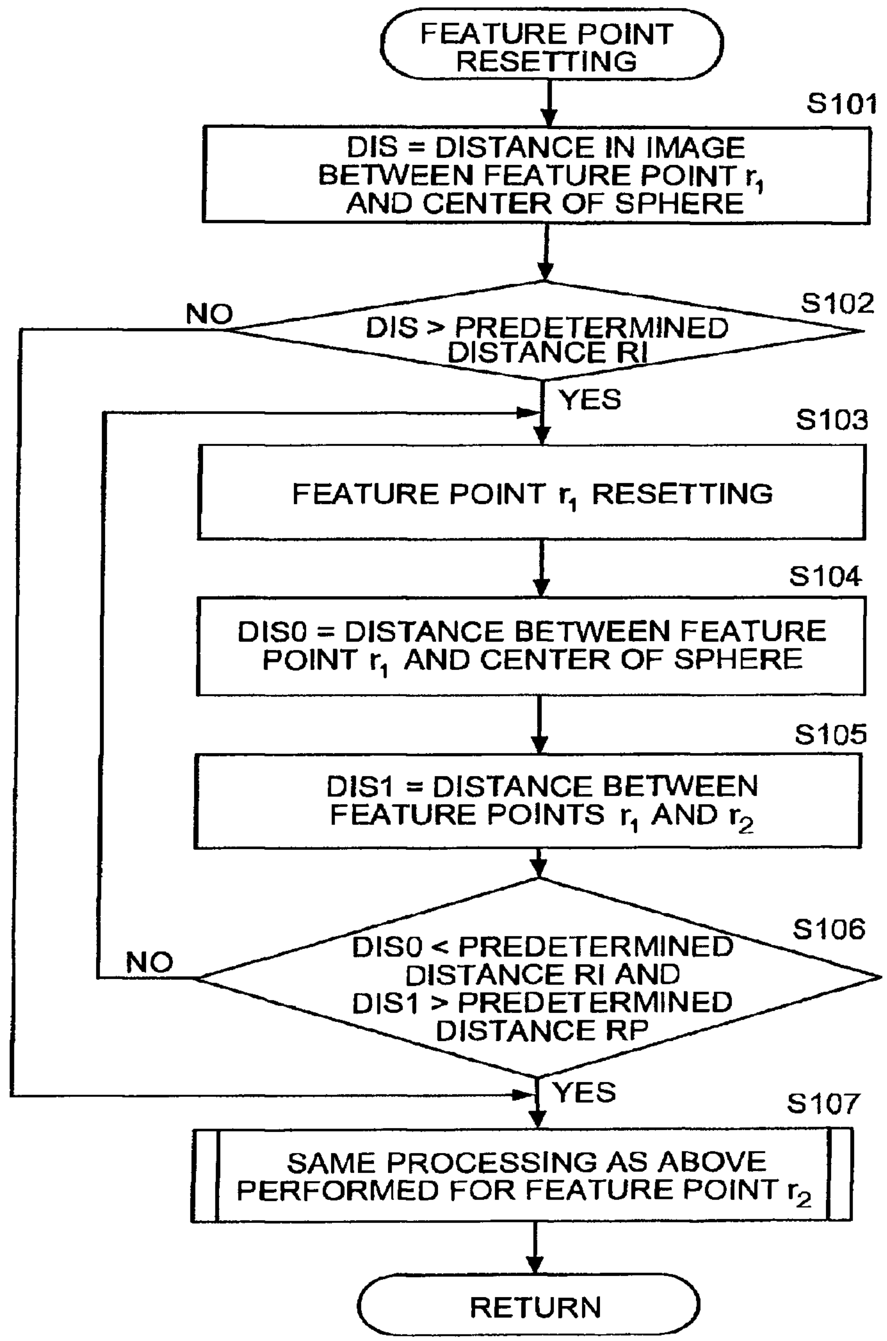

FIG. 9 illustrates the details of feature point resetting. With reference to FIG. 9, the computer 12 calculates the distance DIS in the image between the feature point r1 and the center C of the sphere 22 (S101). Next, the computer 12 determines whether or not the distance DIS is longer than the predetermined distance RI (S102). If the distance DIS is longer than the predetermined distance RI, that is, if the feature point r1 departs from the limited circle LC (YES in S102), as in step S3 above, the computer 12 resets a new feature point r1 (S103). Next, the computer 12 calculates the distance DIS0 in the image between the new feature point r1 and the center C of the sphere 22 (S104), and calculates the distance DIS1 between the feature point r1 and the feature point r2 (S105). Next, the computer 12 determines whether or not the distance DIS0 is shorter than the predetermined distance RI and the distance DIS1 is longer than the predetermined distance RP (S106). If the distance DIS0 is longer than the predetermined distance RI, that is, if the new feature point r1 resides outside the limited circle LC (NO in S106), or if the distance DIS1 is shorter than the predetermined distance RP, that is, if the new feature point r1 has a distance to the other feature point r2, which is smaller than the predetermined distance RP (NO in S106), steps S103 to S105, which have been described above, are repeated. Consequently, a new feature point r1 is reset in a position that is within the limited circle LC and a distance longer than the predetermined distance RP away from the other feature point R2. The same processing as in steps S101 to S106, which have been described above, is also performed for the feature point r2.

Referring back to FIG. 3 again, the computer 12 draws a picture of the three-dimensional object rotated at step S9, which has been described above, on the display 14 (S11).

As described above, according to an embodiment of the present invention, two feature points r1 and r2 are selected from an image of the sphere 22 taken by the camera 26, two-dimensional coordinates (x, y) in the image of the feature points r1 and r2 are set, and the feature points are tracked. The two-dimensional coordinates (x, y) of the feature points r1 and r2 are sampled at predetermined time intervals, and transformed into three-dimensional coordinates (X, Y, Z) on the surface of the sphere 22. A rotation matrix R representing the rotation of the sphere 22 is calculated based on the three-dimensional coordinates (X, Y, Z) of the feature points r1 and r2 before and after movement of the feature points in a predetermined time period. Accordingly, upon the sphere 22 being rotated by means of a user's operation, the rotation of the sphere 22 is determined based on the image of the sphere 22 taken by the camera 26, and the three-dimensional object is rotated in conjunction with the determined rotation. Accordingly, the three-dimensional object displayed on the screen can freely be rotated by means of instinctive operation.

Although in the above embodiment, triangles are drawn on the surface of the sphere 22, there are no specific limitations on the figure shape, size, count, etc., and it is only necessary that a pattern allowing the rotation of the sphere 22 to be easily detected be drawn. Furthermore, nothing may be drawn if the precision of the camera 26 is so high that the fine ground pattern that is invisible to the naked eye can be detected.

In general, a rotation of a sphere can be determined if movement of at least two points on the surface of the sphere is determined, and thus, in the above embodiment, two feature points are provided; however, three or more feature points may be provided. In such case, although the amount of information to be processed is increased, the calculation accuracy is enhanced.

Also, although in the above embodiment, the rotation information input device 20 that rotatably supports the sphere 22 via the tripod 24 to make the camera 26 take an image of the sphere 22 has been used, the sphere 22 and the camera 26 may be downsized to be embedded in the mouse 18 or the keyboard 16.

Also, although in the above embodiment, a three-dimensional object displayed on the screen can only be rotated in its position, it may be moved three-dimensionally. For that purpose, for example, detection may be performed not only for rotation of the sphere 22, but also for three-dimensional movement of the sphere 22.

Although an embodiment of the present invention has been described above, the above-described embodiment is only an example for carrying out the present invention. Accordingly, the present invention is not limited to the above-described embodiment, and the present invention can be carried out by arbitrarily modifying the above-described embodiment as long as such modification does not deviate from the spirit of the present invention.

The invention claimed is:

1. A three-dimensional object display control system for rotating a three-dimensional object displayed on a screen, the system comprising:

a rotatable sphere;

a camera configured to acquire an image of the sphere;

a rotation determiner configured to determine a rotation of the sphere based on the image of the sphere, wherein the rotation determiner comprises:

a feature point setter configured to set at least two feature points in the image of the sphere;

a feature point tracker configured to track the at least two feature points;

a determiner configured to determine the rotation of the sphere based on the at least two feature points tracked by the feature point tracker; and a feature point resetter configured to determine whether a first distance in the image from a first feature point of the at least two feature points tracked by the feature point tracker to a center of the sphere is longer than a first predetermined distance and, in response to determination that the first distance is longer than the first predetermined distance, reset the first feature point, such that a second distance in the image from the first feature point to the center of the sphere is shorter than the first predetermined distance; and an object rotator configured to rotate the three-dimensional object based at least in part on the rotation determined by the rotation determiner.

2. The three-dimensional object display control system according to claim 1, wherein:

the feature point setter is further configured to set two-dimensional coordinates in the image of the feature points;

the feature point tracker is configured to update the two-dimensional coordinates so as to provide updated two-dimensional coordinates; and the rotation determiner further comprises:

a sampler configured to obtain the updated two-dimensional coordinates at predetermined time intervals so as to provided sampled two-dimensional coordinates;

a coordinate transformer configured to transform the sampled two-dimensional coordinates into three-dimensional coordinates on a surface of the sphere; and a rotation matrix calculator configured to calculate a rotation matrix representing the rotation of the sphere based on the three-dimensional coordinates.

3. The three-dimensional object display control system according to claim 1, wherein a third distance in the image from the first feature point to a second feature point in the at least two feature points is longer than a second predetermined distance.

4. The three-dimensional object display control system according to claim 1, wherein the object rotator is configured to multiply vertex coordinates of the three-dimensional object by a rotation matrix.

5. The three-dimensional object display control system according to claim 1, wherein the feature point resetter is configured to set a limited circle within the image of the sphere.

6. The three-dimensional object display control system according to claim 5, wherein a radius of the limited circle is half the radius of the sphere.

7. The three-dimensional object display control system according to claim 5, wherein the rotation determiner is configured to determine the rotation of the sphere from new feature points set within the limited circle.

8. A three-dimensional object display control method for rotating a three-dimensional object displayed on a screen, the method comprising:

rotating a sphere;

acquiring an image of the sphere with a camera;

setting at least two feature points in the image of the sphere;

tracking the at least two feature points;

determining whether a first distance in the image from a first feature point of the at least two feature points to a center of the sphere is longer than a first predetermined distance and, in response to determination that the first distance is longer than the first predetermined distance, resetting the first feature point such that a second distance in the image from the first feature point to the center of the sphere is shorter than the first predetermined distance;

determinimg a rotation of the sphere based on the at least two feature points; and rotating the three-dimensional object in conjunction with the determined rotation of the sphere.

9. The three-dimensional object display control method according to claim 8, wherein determining the rotation of the sphere further comprises:

setting two-dimensional coordinates in the image of the feature points;

updating the two-dimensional coordinates so as to provide; updated two-dimensional coordinates:

obtaining the updated two-dimensional coordinates of the feature points at predetermined time intervals so as to provide sampled two-dimensional coordinates;

transforming the sampled two-dimensional coordinates into three-dimensional coordinates on a surface of the sphere; and calculating a rotation matrix representing the rotation of the sphere based on the three-dimensional coordinates.

10. The three-dimensional object display control method according to claim 8, wherein a distance in the image from the first feature point to a second feature point of the at least two feature points is longer than a second predetermined distance.

11. The three-dimensional object display control method according to claim 8, wherein rotating the three-dimensional object further comprises multiplying vertex coordinates of the three-dimensional object by a rotation matrix.

12. The three-dimensional object display control method according to claim 8, wherein determining the rotation of the sphere further comprises setting a limited circle within the image of the sphere.

13. The three-dimensional object display control method according to claim 12, wherein the radius of the limited circle is half the radius of the sphere.

14. The three-dimensional object display control method according to claim 12, wherein the at least two feature points comprise new feature points set within the limited circle and the rotation of the sphere is determined from the new feature points set within the limited circle.

15. A three-dimensional object display control program stored on a computer readable non-transitory medium for rotating a three-dimensional object displayed on a screen, which, when executed by a processor, causes the processor to obtain an image of a sphere;

set at least two feature points in the image of the sphere;

track the at least two feature points;

determine whether a first distance in the image from a first feature point of the at least two feature points to a center of the sphere is longer than a first predetermined distance and, in response to determination that the first distance is longer than the first predetermined distance, reset the first feature point such that a second distance in the image from the first feature point to the center of the sphere is shorter than the first predetermined distance;

determine the rotation of the sphere based on the at least two feature points; and rotate the three-dimensional object based on the rotation of the sphere.

16. The three-dimensional object display control program according to claim 15, which, when executed by the processor, causes the processor to determine the rotation of the sphere by: setting two-dimensional coordinates in the image of the feature points;

updating the two-dimensional coordinates so as to provide updated two-dimensional coordinates;

obtaining the updated two-dimensional coordinates at predetermined time intervals so as to provide sampled two-dimensional coordinates;

transforming the sampled two-dimensional coordinates into three-dimensional coordinates on a surface of the sphere; and calculating a rotation matrix representing the rotation of the sphere based on the three-dimensional coordinates.

17. The three-dimensional object display control program according to claim 15, wherein a distance in the image from the first feature point to a second feature point in the at least two feature points is longer than a second predetermined distance.

18. The three-dimensional object display control program according to claim 15, which, when executed by the processor, causes the processor to rotate the three-dimensional object by multiplying vertex coordinates of the three-dimensional object by a rotation matrix.

19. The three-dimensional object display control program according to claim 15, which, when executed by the processor, causes the processor to determine the rotation of the sphere by setting a limited circle within the image of the sphere.

20. The three-dimensional object display control program according to claim 19, which, when executed by the processor, causes the processor to determine the rotation of the sphere from new feature points set within the limited circle.

* * * * *

UNITED STATES PATENT AND TRADEMARK OFFICE

CERTIFICATE OF CORRECTION

PATENT NO. : 8,462,105 B2
APPLICATION NO. : 12/665591
DATED : June 11, 2013
INVENTOR(S) : Kobayashi et al.

It is certified that error appears in the above-identified patent and that said Letters Patent is hereby corrected as shown below:

Title Page should be deleted and substitute therefor the attached title page.

On the Title Page, in the Figure, for Step "S101", in Line 2, delete "r1" and insert -- $r_1$ --, therefor.

On the Title Page, in the Figure, for Step "S103", in Line 1, delete "r1" and insert -- $r_1$ --, therefor.

On the Title Page, in the Figure, for Step "S104", in Line 2, delete "r1" and insert -- $r_1$ --, therefor.

On the Title Page, in the Figure, for Step "S105", in Line 2, delete "r1 AND r2" and insert -- $r_1$ AND $r_2$ --, therefor.

On the Title Page, in the Figure, for Step "S107", in Line 2, delete "r2" and insert -- $r_2$ --, therefor.

In the Drawings

In Fig. 2, Sheet 2 of 8, delete "r1" and insert -- $r_1$ --, therefor.

In Fig. 2, Sheet 2 of 8, delete "r2" and insert -- $r_2$ --, therefor.

In Fig. 9, Sheet 8 of 8, for Step "S101", in Line 2, delete "r1" and insert -- $r_1$ --, therefor.

In Fig. 9, Sheet 8 of 8, for Step "S103", in Line 1, delete "r1" and insert -- $r_1$ --, therefor.

In Fig. 9, Sheet 8 of 8, for Step "S104", in Line 2, delete "r1" and insert -- $r_1$ --, therefor.

Signed and Sealed this
Twelfth Day of November, 2013

Teresa Stanek Rea
*Deputy Director of the United States Patent and Trademark Office*

In Fig. 9, Sheet 8 of 8, for Step “S105”, in Line 2, delete “r1 AND r2” and insert -- $r_1$ AND $r_2$ --, therefor.

In Fig. 9, Sheet 8 of 8, for Step “S107”, in Line 2, delete “r2” and insert -- $r_2$ --, therefor.

In the Specifications

In Column 1, Lines 7-19, delete “A three-dimensional object display control system............by the rotation determiner.” and insert -- The present invention relates to a three-dimensional object display control system and method, and more specifically relates to a three-dimensional object display control system and method for rotating a three-dimensional object (3D object) displayed on a screen. --, therefor.

In Column 2, Line 27, delete “rotation determining means and object rotating means.” and insert -- a rotation determiner and an object rotator. --, therefor.

In Column 2, Lines 30-31, delete “determining means determines” and insert -- determiner is arranged to determine --, therefor.

In Column 2, Line 32, delete “rotating means rotates” and insert -- rotator arranged to rotate --, therefor.

In Column 2, Line 34, delete “determining means.” and insert -- determiner. --, therefor.

In Column 4, Line 5, delete “r1' and r2',” and insert -- $r'_1$ and $r'_2$, --, therefor.

In Column 4, Line 7, delete “φ2;” and insert -- $\varphi_2$; --, therefor.

In Column 5, Line 13, delete “r1 and r2” and insert -- $r_1$ and $r_2$ --, therefor.

In Column 5, Line 15, delete “r1 and r2” and insert -- $r_1$ and $r_2$ --, therefor.

In Column 5, Line 16, delete “r1 and r2” and insert -- $r_1$ and $r_2$ --, therefor.

In Column 5, Line 17, delete “r1 and r2” and insert -- $r_1$ and $r_2$ --, therefor.

In Column 5, Line 28, delete “r1 and r2” and insert -- $r_1$ and $r_2$ --, therefor.

In Column 5, Line 29, delete “r1 and r2” and insert -- $r_1$ and $r_2$ --, therefor.

In Column 5, Line 32, delete “r1 and r2” and insert -- $r_1$ and $r_2$ --, therefor.

In Column 5, Line 34, delete “r1 and r2” and insert -- $r_1$ and $r_2$ --, therefor.

In Column 5, Line 35, delete "r1 and r2" and insert -- $r_1$ and $r_2$ --, therefor.

In Column 5, Line 37, delete "r1 and r2" and insert -- $r_1$ and $r_2$ --, therefor.

In Column 5, Line 40, delete "r1 and r2" and insert -- $r_1$ and $r_2$ --, therefor.

In Column 5, Line 54, delete "r1 and r2" and insert -- $r_1$ and $r_2$ --, therefor.

In Column 6, Line 12, delete "Rc" and insert -- $R_c$ --, therefor.

In Column 6, Line 23, delete "Rc and the radius rc" and insert -- $R_c$ and the radius $r_c$ --, therefor.

In Column 6, Line 39, delete "r1 and r2." and insert -- $r_1$ and $r_2$. --, therefor.

In Column 7, Lines 3-5, in Equation (7), delete

"$$R(l,\theta)=\begin{pmatrix} l_x^2(1-\cos\theta)+\cos\theta & l_xl_y(1-\cos\theta)-l_z\sin\theta & l_xl_z(1-\cos\theta)+l_y\sin\theta \\ l_xl_y(1-\cos\theta)-l_z\sin\theta & l_y^2(1-\cos\theta)+\cos\theta & l_yl_z(1-\cos\theta)+l_x\sin\theta \\ l_xl_z(1-\cos\theta)+l_y\sin\theta & l_yl_z(1-\cos\theta)+l_x\sin\theta & l_z^2(1-\cos\theta)+\cos\theta \end{pmatrix}$$" and insert --

$$R(l,\theta)=\begin{pmatrix} l_x^2(1-\cos\theta)+\cos\theta & l_xl_y(1-\cos\theta)-l_z\sin\theta & l_xl_z(1-\cos\theta)+l_y\sin\theta \\ l_xl_y(1-\cos\theta)+l_z\sin\theta & l_y^2(1-\cos\theta)+\cos\theta & l_yl_z(1-\cos\theta)-l_x\sin\theta \\ l_xl_z(1-\cos\theta)-l_y\sin\theta & l_yl_z(1-\cos\theta)+l_x\sin\theta & l_z^2(1-\cos\theta)+\cos\theta \end{pmatrix}$$ --, therefor.

In Column 7, Line 17, delete "r1 to r1'" and insert -- $r_1$ to $r'_1$ --, therefor.

In Column 7, Line 18, delete "r1'=Rr1." and insert -- $r'_1=Rr_1$. --, therefor.

In Column 7, Line 18, delete "r2 to r2'" and insert -- $r_2$ to $r'_2$ --, therefor.

In Column 7, Line 19, delete "r2'=Rr2." and insert -- $r'_2=Rr_2$. --, therefor.

In Column 7, Line 25, delete "RESO(3)" and insert -- $R\varepsilon SO(3)$ --, therefor.

In Column 7, Line 30, delete "11, and then rotated around an axis 12," and insert -- $l_1$, and then rotated around an axis $l_2$, --, therefor.

In Column 7, Line 31, delete "r1 to be moved to r1' and r2 to be moved to r2'." and insert -- $r_1$ to be moved to $r'_1$ and $r_2$ to be moved to $r'_2$. --, therefor.

In Column 7, Line 32, delete "R1" and insert -- $R_1$ --, therefor.

In Column 7, Line 32, delete "11)" and insert -- $l_1$) --, therefor.

In Column 7, Line 33, delete "r1 on the point r1" and insert -- $r_1$ on the point $r'_1$ --, therefor.

In Column 7, Line 34, delete "11" and insert -- $l_1$ --, therefor.

In Column 7, Lines 35-36, delete "r1 and the point r1'." and insert -- $r_1$ and the point $r'_1$. --, therefor.

In Column 7, Line 36, delete "r2" and insert -- $r_2$ --, therefor.

In Column 7, Line 37, delete "r2'=R1r2. Next, a rotation matrix R2" and insert -- $r'_2=R_1r_2$. Next, a rotation matrix $R_2$ --, therefor.

In Column 7, Line 38, delete "12" and insert -- $l_2$ --, therefor.

In Column 7, Line 39, delete "r1' to superpose the point r2' on the point r2''" and insert -- $r'_1$ to superpose the point $r'_2$ on the point $r'_2$ --, therefor.

In Column 7, Line 41, delete "R=R2R1" and insert -- $R=R_2R_1$ --, therefor.

In Column 7, Line 43, delete "axis" and insert -- axis $l_1$ --, therefor.

In Column 7, Line 44, delete "R1" and insert -- $R_1$ --, therefor.

In Column 7, Line 54, delete "φ1" and insert -- $\varphi_1$ --, therefor.

In Column 7, Line 54, delete "11" and insert -- $l_1$ --, therefor.

In Column 7, Line 63, delete "$0 \leqq \phi 1 < \pi/2$" and insert -- $0 \leqq \phi_1 < \pi/2$ --, therefor.

In Column 7, Line 66, delete "r1=r1'," and insert -- $r1=r'_1$, --, therefor.

In Column 7, Line 66, delete "11" and insert -- $l_1$ --, therefor.

In Column 7, Line 67, delete "φ1=0." and insert -- $\varphi_1=0$. --, therefor.

In Column 8, Line 10, delete "12" and insert -- $l_2$ --, therefor.

In Column 8, Line 11, delete "R2" and insert -- $R_2$ --, therefor.

In Column 8, Line 20, delete "φ2" and insert -- $\varphi_2$ --, therefor.

In Column 8, Line 21, delete "12'" and insert -- $l'_2$ --, therefor.

In Column 8, Line 22, delete "r2' and the point r2'" and insert -- $r'_2$ and the point $r'_2$ --, therefor.

In Column 8, Line 23, delete "12" and insert -- $l_2$ --, therefor.

In Column 8, Line 29, delete "φ2" and insert -- $\varphi_2$ --, therefor.

In Column 8, Line 29, delete "12" and insert -- $l_2$ --, therefor.

In Column 8, Line 39, delete "$0 \leqq \phi 2 < \pi/2.$" and insert -- $0 \leqq \phi_2 < \pi/2.$ --, therefor.

In Column 8, Line 39, delete "r2'=r2'," and insert -- $r'_2=r'_2$, --, therefor.

In Column 8, Line 39, delete "12" and insert -- $l_2$ --, therefor.

In Column 8, Line 40, delete "φ2=0." and insert -- $\varphi_2=0$. --, therefor.

In Column 8, Line 42, delete "(11, φ1) and (12, φ2)" and insert -- $(l_1, \varphi_1)$ and $(l_2, \varphi_2)$ --, therefor.

In Column 8, Lines 44-45, delete "R1=R(11, φ1) and R2=R(12, φ2)" and insert -- $R_1=R(l_1, \varphi_1)$ and $R_2=R(l_2, \varphi_2)$ --, therefor.

In Column 8, Line 61, delete "r1 or r2," and insert -- $r_1$ or $r_2$, --, therefor.

In Column 8, Line 64, delete "r1 or r2" and insert -- $r_1$ or $r_2$ --, therefor.

In Column 9, Line 1, delete "r2 or r1" and insert -- $r_2$ or $r_1$ --, therefor.

In Column 9, Line 9, delete "r1 or r2" and insert -- $r_1$ or $r_2$ --, therefor.

In Column 9, Line 30, delete "r1" and insert -- $r_1$ --, therefor.

In Column 9, Line 34, delete "r1" and insert -- $r_1$ --, therefor.

In Column 9, Line 36, delete "r1" and insert -- $r_1$ --, therefor.

In Column 9, Line 38, delete "r1" and insert -- $r_1$ --, therefor.

In Column 9, Line 40, delete "r1 and the feature point r2" and insert -- $r_1$ and the feature point $r_2$ --, therefor.

In Column 9, Line 45, delete "r1" and insert -- $r_1$ --, therefor.

In Column 9, Line 48, delete "r1 has a distance to the other feature point r2," and insert -- $r_1$ has a distance to the other feature point $r_2$, --, therefor.

In Column 9, Line 51, delete "r1" and insert -- $r_1$ --, therefor.

In Column 9, Line 54, delete "R2." and insert -- $R_2$. --, therefor.

In Column 9, Line 56, delete "r2." and insert -- $r_2$. --, therefor.

In Column 9, Line 61, delete "r1 and r2" and insert -- $r_1$ and $r_2$ --, therefor.

In Column 9, Line 64, delete "r1 and r2" and insert -- $r_1$ and $r_2$ --, therefor.

In Column 9, Lines 65-66, delete "r1 and r2" and insert -- $r_1$ and $r_2$ --, therefor.

In Column 10, Lines 3-4, delete "r1 and r2" and insert -- $r_1$ and $r_2$ --, therefor.

In the Claims

In Column 11, Line 64, in Claim 8, delete "determinimg" and insert -- determining --, therefor.

In Column 11, Lines 66-67, in Claim 8, delete "in conjunction with the determined" and insert -- based on the --, therefor.

In Column 12, Line 6, in Claim 9, delete "provide;" and insert -- provide --, therefor.

In Column 12, Line 7, in Claim 9, delete "coordinates:" and insert -- coordinates; --, therefor.

In Column 12, Lines 8-9, in Claim 9, delete "coordinates of the feature points" and insert -- coordinates --, therefor.

In Column 12, Line 39, in Claim 15, delete "processor to" and insert -- processor to: --, therefor.

In Column 12, Lines 58-59, in Claim 16, delete "setting two-dimensional....feature points;" and insert the same at Line 59.

(12) United States Patent
Kobayashi et al.

(10) Patent No.: US 8,462,105 B2
(45) Date of Patent: Jun. 11, 2013

(54) THREE-DIMENSIONAL OBJECT DISPLAY CONTROL SYSTEM AND METHOD THEREOF

(75) Inventors: Ryo Kobayashi, Hiroshima (JP); Mitsunobu Furuta, Hiroshima (JP); Masakazu Akiyama, Hiroshima (JP)

(73) Assignee: Hiroshima University, Hiroshima (JP)

( * ) Notice: Subject to any disclaimer, the term of this patent is extended or adjusted under 35 U.S.C. 154(b) by 717 days.

(21) Appl. No.: 12/665,591

(22) PCT Filed: Jul. 31, 2008

(86) PCT No.: PCT/JP2008/063747

§ 371 (c)(1), (2), (4) Date: Dec. 18, 2009

(87) PCT Pub. No.: WO2010/013336

PCT Pub. Date: Feb. 4, 2010

(65) Prior Publication Data

US 2011/0037691 A1 Feb. 17, 2011

(51) Int. Cl.
*G09G 5/00* (2006.01)

(52) U.S. Cl.
USPC .......................................................... 345/156

(58) Field of Classification Search
USPC ...... 345/156, 418, 427, 474; 382/107; 348/42
See application file for complete search history.

(56) References Cited

U.S. PATENT DOCUMENTS 6,072,504 A * 6/2000 Segen .......................... 345/474
6,301,372 B1 * 10/2001 Tanaka .......................... 382/106
6,463,116 B1 * 10/2002 Oikawa .......................... 378/4
7,062,082 B2 * 6/2006 Miki et al. .......................... 382/154
7,346,194 B2 * 3/2008 Miki et al. .......................... 382/107

(Continued)

FOREIGN PATENT DOCUMENTS

JP 05-040569 2/1993
JP 06-195168 7/1994

(Continued)

OTHER PUBLICATIONS

"Sandio 3D Game O2," accessed at http://web.archive.org/web/20090503044411/http://www.sandiotech.com/sandio_product.php, accessed on May 24, 2012, pp. 3.

(Continued)

*Primary Examiner* — Fred Tzeng
(74) *Attorney, Agent, or Firm* — Foley & Lardner LLP

(57) ABSTRACT

Provided is a three-dimensional object display control system that enables a three-dimensional object displayed on a screen to be freely rotated by means of instinctive operation. A computer system (10) includes, e.g., a computer (12), a display (14), and a rotation information input device (20). The rotation information input device (20) includes a sphere (22), a tripod (24) that rotatably supports the sphere (22), and a camera (26) that takes an image of the sphere (22). The computer (12) selects two feature points from the image of the sphere (22) taken by the camera (26), and sets two-dimensional coordinates in the image of the feature points. While tracking the feature points, the computer (12) samples the two-dimensional coordinates and transforms them into three-dimensional coordinates on a surface of the sphere (22). Then, the computer (12) calculates a rotation matrix representing a rotation of the sphere (22), based on the three-dimensional coordinates, and multiplies the respective vertex coordinates of the three-dimensional object displayed on the display (14) by the rotation matrix, thereby calculating the respective vertex coordinates of the three-dimensional object after rotated.

20 Claims, 8 Drawing Sheets

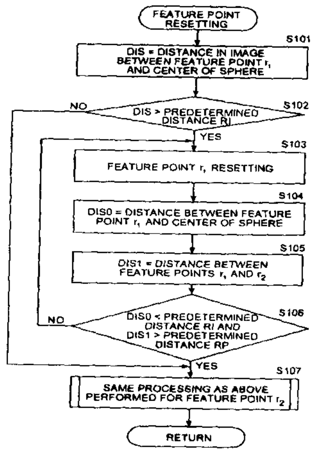

UNITED STATES PATENT AND TRADEMARK OFFICE

CERTIFICATE OF CORRECTION

PATENT NO. : 8,462,105 B2
APPLICATION NO. : 12/665591
DATED : June 11, 2013
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this
Thirtieth Day of December, 2014

Michelle K. Lee
*Deputy Director of the United States Patent and Trademark Office*